United States Patent
Mills

[11] Patent Number: 5,805,717
[45] Date of Patent: Sep. 8, 1998

[54] LIGHT SENSITIVE SWITCH WITH MICROPHONE

[75] Inventor: Stephen E. Mills, Elkhart, Ind.

[73] Assignee: Crown International, Inc., Elkhart, Ind.

[21] Appl. No.: 580,881

[22] Filed: Dec. 29, 1995

[51] Int. Cl.[6] .................................................. H03G 3/20
[52] U.S. Cl. ......................... 381/110; 381/122; 381/123
[58] Field of Search .................................. 381/110, 122, 381/123, 91

[56] References Cited

U.S. PATENT DOCUMENTS 5,259,035  11/1993  Peters et al. ............................. 381/92
5,479,519  12/1995  Davis ...................................... 381/119

*Primary Examiner*—Forester W. Isen
*Attorney, Agent, or Firm*—Baker & Daniels

[57] ABSTRACT

An audio system includes a light sensitive switch connected to a microphone. Activation of the microphone operates the switch, thereby indicating that the microphone is in use. When the user turns the microphone on, a voltage is applied across a light emitting diode which causes the diode to emit light. The light activates the light sensitive switch which is connected to the remainder of the audio system. The system interprets activation of the light sensitive switch as an indication that the microphone is in use and responds accordingly.

9 Claims, 1 Drawing Sheet

LIGHT SENSITIVE SWITCH WITH MICROPHONE

This invention relates to a microphone control system having a light sensitive output switch.

BACKGROUND OF THE INVENTION

Many modern audio systems use microphones to convert sound waves into electronic signals for further processing and amplification. In some such systems, certain operations depend upon whether or not the microphone is in use. For example, in an audio-visual communications system where several microphones can be used alternatively, it is desireable to have the system's camera automatically direct its focus to the user of the active microphone. Accordingly, each microphone must indicate to the video camera tracking circuitry that it is in use by sending a "MIC ON" indicator signal.

Approaches to communicating a "MIC ON" indicator signal to a subsystem include providing a user-operated switch which either mechanically or electrically causes a change in the characteristics of a signal applied at a node being sensed by the external subsystem. Such approaches are undesirable because in many audio systems, mechanical or electrical activation of switches can cause instantaneous power spikes which can propagate through the system and result in undesirable audible impulses or "pops."

SUMMARY OF THE INVENTION

The present invention provides an optically activated switch to communicate a "MIC ON" indicator signal. In the present invention, the user operates a switch before using a microphone. Operation of the switch turns on a light emitting diode, which operates a light sensitive switch. The light sensitive switch indicates to an external circuit, such as a video camera control system, that the microphone is enabled.

Accordingly, it is an object of the invention to produce a "MIC ON" indicator signal which is electrically isolated from the microphone electronics to reduce or eliminate the noise associated with operation of electrically coupled switches.

Other advantages will become apparent upon a reading of the following description.

BRIEF DESCRIPTION OF THE DRAWING

The sole FIGURE of the Drawing is a block diagram of a microphone control system made pursuant to the teachings of the present invention.

DESCRIPTION OF THE PREFERRED EMBODIMENT

Figure 1:
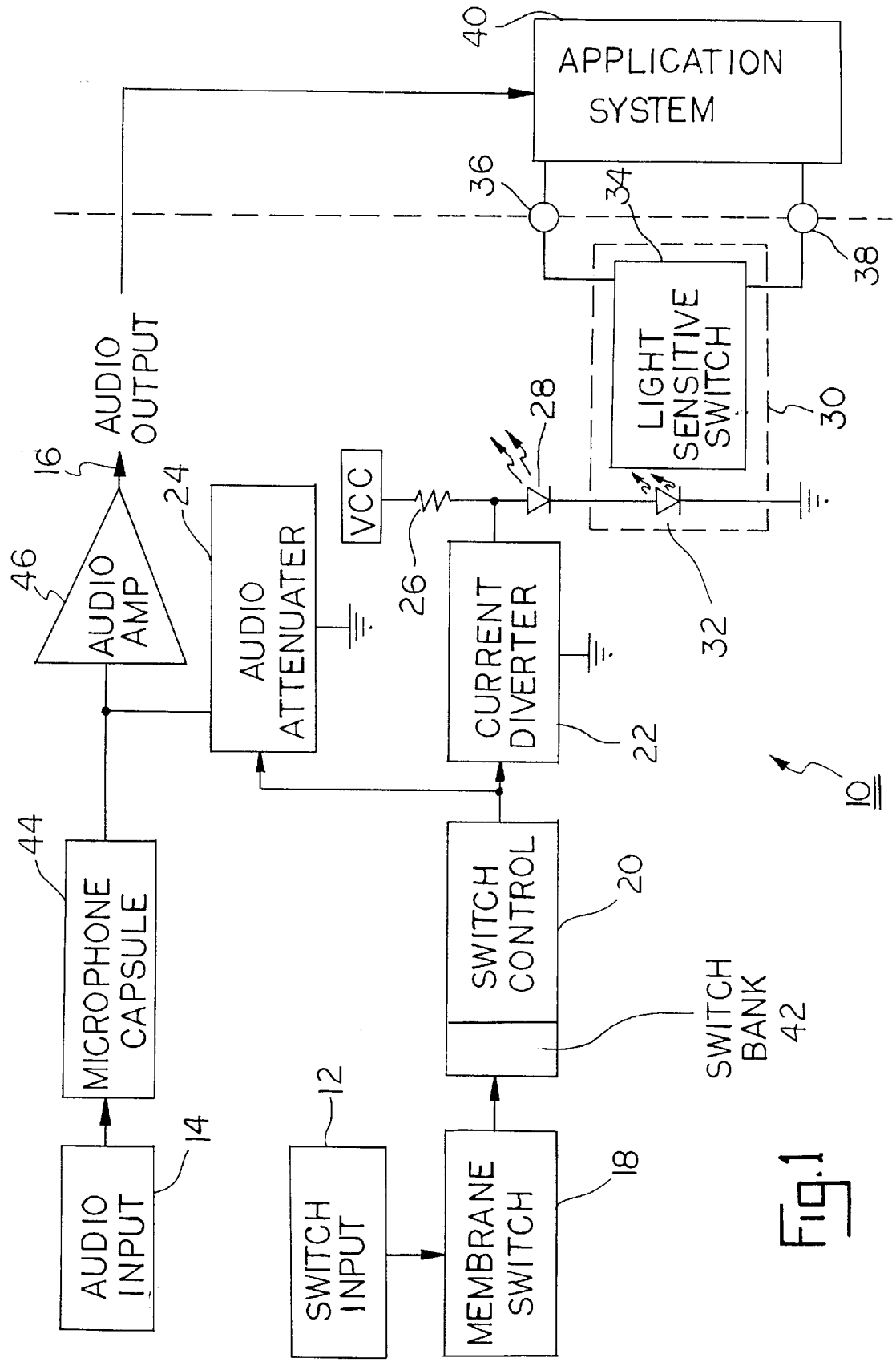

The preferred embodiment illustrated herein is not intended to be exhaustive or to limit the invention to the precise form disclosed. It is chosen to illustrate the invention and to assist one having ordinary skill in the art to best utilize the invention.

Referring now to the drawing, a microphone system 10 is typically contained within a small enclosure (not shown) suitable for placement on a table top, and includes a switch input 12 and an audio input 14. As will hereinafter be further explained, audio input 14 will not result in an audio output 16 unless switch input 12 activates membrane switch 18.

Switch input 12 is provided by the user by physically manipulating membrane switch 18. Membrane switch 18 is connected to switch control 20. Switch control 20 can be preset by the user to determine the operation of membrane switch 18 as will hereinafter be further explained. Switch control 20 is connected to current diverter 22 and audio attenuator 24. Both current diverter 22 and audio attenuator 24 can provide either high resistance paths to ground or low resistance paths to ground, depending on the signal they receive from switch control 20. Current diverter 22 is connected between resistor 26 and a light emitting diode (LED) 28 which, when activated, provides the user with a visual indication that the microphone is in use. LED 28 is connected to light sensitive relay block 30. Light sensitive relay block 30 can be implemented using standard, off-the-shelf components, and preferably includes a second light emitting diode (LED) 32 which controls a light sensitive switch 34. Light sensitive switch 34 responds to LED 32 to open and close the path between node 36 and node 38. Nodes 36,38 are connected, generally by cable, to a remotely located application system 40 which may include a video camera control system.

Switch control 20 contains switch bank 42 which consists of a plurality of manually changeable switches, such as DIP switches, to permit the user to configure the operation of membrane switch 18 by positioning the settings of the switches in switch bank 42. Depending on the combination of settings of these switches, membrane switch 18 can operate as a momentarily on switch, activating microphone system 10 only when depressed, a momentarily off switch, deactivating microphone system 10 only when depressed, or a toggle switch, alternately activating and deactivating microphone system 10 each time it is depressed and released.

MODE OF OPERATION

In operation, the user provides switch input 12 which activates membrane switch 18. Whether the user must depress and hold, depress and release, or depress membrane switch 18 at all to activate microphone system 10 depends upon the preset configuration of switch bank 42 as described above. When membrane switch 18 is activated, switch control 20 removes the signal normally provided to audio attenuator 24 and current diverter 22. Without inputs, audio attenuator 24 and current diverter 22 simultaneously become high resistance paths to ground. Consequently, current provided at a regulated voltage through resistor 26 at node Vcc, normally diverted to ground by current diverter 22, is permitted to flow through LEDs 28,32 causing them to emit light.

The light emitted from LED 28 is visible to the user and indicates the activated condition of microphone system 10. The user then provides an audio signal as audio input 14 through an opening in the system enclosure to microphone capsule 44 located within the enclosure. Microphone capsule 44 is a commonly known sound transducer which converts audio input 14 into an electrical signal representing the audio information contained in audio input 14. Since audio attenuator 24 presents a high resistance path to ground when membrane switch 18 is activated, the output of microphone capsule 44 is not passed through audio attenuator 24, but instead is transmitted to audio amplifier 46. Audio amplifier 46 amplifies the output of microphone capsule 44 using methods commonly known in the art, and provides audio output 16 to application system 40 for further processing which is not relevant to understanding of the present invention.

The light emitted by LED 32 activates light sensitive switch 34 of light sensitive relay block 30. Light sensitive switch 34 then closes, connecting node 36 to node 38. Application system 40 senses the path provided between nodes 36 and 38 by light sensitive switch 34 and responds, causing, for example, a video camera to direct its focus to the user of the microphone. It should be apparent that light sensitive switch 34 could be alternately configured to respond to the light emitted by LED 32 by opening, thereby disconnecting node 36 from node 38. In such a circuit, application system 40 would be designed to interpret an open circuit between nodes 36 and 38 as a command to direct the video camera as described above.

To deactivate microphone system 10, the user again provides an appropriate switch input 12 to membrane switch 18. Membrane switch 18 causes switch control 20 to provide a signal to both audio attenuator 24 and current diverter 22. This simultaneously disables the audio portion of the system and light sensitive relay block 30. Audio attenuator 24 becomes a low resistance path to ground and diverts the output of microphone capsule 44 to ground, thereby eliminating the signal to audio amplifier 46. Current diverter 22 likewise becomes a low resistance path to ground and diverts the current passing through resistor 26 to ground. Consequently, the voltage across LED 28 and LED 32 becomes insufficient to cause the LEDs to emit light. Light sensitive switch 34 opens, thereby disconnecting node 36 from node 38. Application system 40 interprets this open circuit as an indication that microphone system 10 is no longer in use and responds accordingly.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. Method of controlling a subsystem associated with a microphone in response to activation of a light sensitive switch, said method comprising the steps of:

activating said microphone by operating a switch connected thereto;

activating a light source in response to said operating of said switch and disabling an audio attenuator in response to said activation of said microphone thereby allowing an audio input present at said microphone to be amplified for output by disabling a current diverter connected to said light source in response to activation of said microphone thereby activating said light source.

2. Method of controlling a subsystem as claimed in claim 1, wherein said method includes the steps of turning on a light to visually indicate to the user that said microphone is activated.

3. A mechanism for communicating with a subsystem in response to enabling or disabling a microphone comprising:

switch means switchable between an activated state enabling the microphone and a deactivated state disabling the microphone;

a first light source;

a light sensitive switch responsive to said first light source for controlling the subsystem; and control means connected between said switch means and said first light source for controlling said first light source in response to operation of said switch means, whereby when said switch means is switched into said activated state, said control means turns on said first light source thereby operating said light sensitive switch indicating to the subsystem that the microphone is enabled, and when said switch means is switched into said deactivated state, said control means turns off said first light source thereby indicating to the subsystem that the microphone is disabled, said control means including an audio attenuator controlled by said switch means, said audio attenuator enabling the microphone when said switch means is switched into said activated state and disabling the microphone when said switch means is in said deactivated state, said switch means including a manually operated button and a plurality of switches connected between said button and said control means, said switches switchable into a plurality of preset configurations for controlling the operation of said button.

4. Control mechanism of claim 3, said first light source consisting of a light emitting diode connected between a voltage source and ground.

5. A mechanism for communicating with a subsystem in response to enabling or disabling a microphone comprising:

switch means switchable between an activated state enabling the microphone and a deactivated state disabling the microphone;

a first light source;

a light sensitive switch responsive to said first light source for controlling the subsystem; and control means connected between said switch means and said first light source for controlling said first light source in response to operation of said switch means, whereby when said switch means is switched into said activated state, said control means turns on said first light source thereby operating said light sensitive switch indicating to the subsystem that the microphone is enabled, and when said switch means is switched into said deactivated state, said control means turns off said first light source thereby indicating to the subsystem that the microphone is disabled, said control means including an audio attenuator controlled by said switch means, said audio attenuator enabling the microphone when said switch means is switched into said activated state and disabling the microphone when said switch means is in said deactivated state, a current diverter connected between said voltage source and said first light source, said current diverter constituting means for turning off said first light source by diverting current from said voltage source to ground when said switch means is switched into said deactivated state, said current diverter being disabled in response to activation of said microphone thereby activating said light source.

6. Control mechanism of claim 5 including an enclosure housing the microphone, wherein said manually operated button is mounted to the exterior of said enclosure, and said subsystem is disposed external to said enclosure and connected to said light sensitive switch, said current diverter diverting the current supplied to the microphone within said enclosure.

7. Control mechanism of claim 6 including a second light source mounted to said enclosure controlled by said current diverter, said second light source emitting light visible to the user when said switch means is activated and being turned off by said current diverter when said switch means is deactivated.

8. Control mechanism of claim 7, said enclosure having a screened cover for permitting sound waves to reach the microphone, a plurality of switches being mounted to said enclosure for external switchability, said first light source, said light sensitive switch, and said control means being mounted to the interior of said enclosure.

9. Control mechanism of claim 7, said second light source being connected in series with said first light source, whereby said current passes through both of said light sources when said switch means is switched into said activated state.

\* \* \* \* \*